United States Patent
Ikeda

(10) Patent No.: US 7,030,913 B2
(45) Date of Patent: Apr. 18, 2006

(54) WHITE BALANCE CONTROL APPARATUS AND METHOD, AND IMAGE PICKUP APPARATUS

(75) Inventor: Junichi Ikeda, Miyagi (JP)

(73) Assignee: Ricoh Company, Ltd., Tokyo (JP)

( * ) Notice: Subject to any disclaimer, the term of this patent is extended or adjusted under 35 U.S.C. 154(b) by 965 days.

(21) Appl. No.: 10/055,964

(22) Filed: Jan. 28, 2002

(65) Prior Publication Data
US 2002/0101516 A1    Aug. 1, 2002

(30) Foreign Application Priority Data
Jan. 31, 2001    (JP)    ............... 2001-024636

(51) Int. Cl.
H04N 9/73    (2006.01)
(52) U.S. Cl. .................. 348/223.1; 348/655
(58) Field of Classification Search ............ 348/223.1, 348/655, 234
See application file for complete search history.

(56) References Cited

U.S. PATENT DOCUMENTS

| | | | | |
|---|---|---|---|---|
| 5,282,022 A | * | 1/1994 | Haruki et al. | 348/223.1 |
| 5,517,333 A | * | 5/1996 | Tamura et al. | 358/518 |
| 5,619,347 A | * | 4/1997 | Taniguchi et al. | 358/516 |
| 6,075,562 A | | 6/2000 | Sakaguchi et al. | |
| 6,670,987 B1 | * | 12/2003 | Taura | 348/223.1 |
| 6,795,115 B1 | * | 9/2004 | Okazaki | 348/223.1 |

FOREIGN PATENT DOCUMENTS

JP    2-26193    1/1990

* cited by examiner

Primary Examiner—Ngoc-Yen Vu
Assistant Examiner—Gary C. Vieaux
(74) Attorney, Agent, or Firm—Dickstein Shapiro Morin & Oshinsky LLP

(57) ABSTRACT

A white balance control apparatus includes an evaluation value calculation circuit calculating and outputting evaluation values of color components of each of a plurality of regions of digital image data, a luminance conversion part converting the evaluation values of each of the regions into a luminance value, and a high-luminance weighting part converting the evaluation values of each of the regions into a base white balance control amount, calculating a non-weighted white balance control amount from the base white balance control amount and a weighted white balance control amount by performing weighting processing on the base white balance control amount by using the luminance value of each of the regions so that a region of higher luminance has a greater weight, and calculating a white balance control amount to be applied to the image data at a time of image recording by using the weighted and non-weighted white balance control amounts.

27 Claims, 5 Drawing Sheets

WHITE BALANCE CONTROL APPARATUS AND METHOD, AND IMAGE PICKUP APPARATUS

BACKGROUND OF THE INVENTION

1. Field of the Invention

The present invention generally relates to white balance control apparatuses and methods, and image pickup apparatuses, and more particularly to a white balance control apparatus suitably mounted in a digital camera or a video camera, a white balance control method suitably used therein, and an image pickup apparatus employing such a white balance control apparatus.

2. Description of the Related Art

A digital camera or a video camera employing an image pickup element such as a charge-coupled device (CCD) requires color balance adjustment to be properly performed on the color temperature of a light source illuminating an object. Without such proper adjustment, a difference would be generated between a visual image of the object and the color tone of an acquired image of the object as a result of color corrections made unconsciously by a human brain, thus causing a viewer of the object to perceive a difference between the visual image and the acquired image of the object. Therefore, digital cameras in general are provided with automatic white balance control apparatuses that reduce the impression of the unnatural color tone of an image acquired under a usually experienced white light source by automatically correcting the color balance of the white light source so that the color of the white light source becomes achromatic.

Two methods are mainly employed in the conventional white balance control apparatuses. One is an external measurement method that provides an external color temperature sensor apart from an image pickup system and corrects the color tone of the image pickup system in accordance with the output signal of the sensor. The other one is a TTL (Through The Lens) method that obtains a correction of the color tone by using color information on an image captured by the image pickup system. Further, the TTL method can be divided roughly into an entire screen average method that corrects the sum of all the color differences of the captured image to zero in accordance with an empirical rule and a white detection method that extracts a white region from the captured image and corrects the color difference of the region to zero. Since the external measurement method requires a special sensor and the entire screen average method causes a greater error, the white detection method has been mainly used. The present invention relates to the white detection method of the TTL method.

Japanese Laid-Open Patent Application No. 2-26193 discloses a white detection method that obtains values of Cr/Y and Cb/Y by using values of Y, Cr, and Cb that are color information and determines that a pixel is white if the values of Cr/Y and Cb/Y of the pixel fall within a given range along a characteristic curve of blackbody radiation on a Cb/Y-Cr/Y coordinate plane. Here, Y, Cr, and Cb are a luminance value, a color difference value R-Y, and a color difference value B-Y of the pixel.

When the values Cr/Y and Cb/Y are obtained from the values Y, Cr, and Cb obtained by a CCD that is an image input device, the values of Cr/Y and Cb/Y of pixels of the same color are uniquely determined on the Cb/Y-Cr/Y coordinate plane. Further, the blackbody radiation characteristic of an object according to the color temperature of a light source, which characteristic is related to white balance control, appears on the Cb/Y-Cr/Y coordinate plane as a curve shown in FIG. 1.

Therefore, it is highly probable that a region showing Cr/Y and Cb/Y values close to the curve is a white region. According to the white detection method disclosed in the above-mentioned Japanese Laid-Open Patent Application No. 2-26193, a region in a captured image, which region shows Cr/Y and Cb/Y values included in the hatched part of FIG. 1 defined by four straight lines to include the blackbody radiation characteristic curve, is detected as a white region, and white balance adjustment is made by performing tone correction so that the color difference of the detected region is corrected to zero.

If no white region exists in the captured image, conditions for white detection are relaxed and an amount of correction is obtained by using the color information of the entire image. At this point, however, the amount of correction is restricted so as not to make excessive color correction on an object of a chromatic color.

The above-described white detection method employs, for a white object, the Cr/Y and Cb/Y values that are constant irrespective of the luminance of image data. Therefore, this method has an advantage of reducing errors caused by mistakenly determining an object of a strong chromatic color of low luminance to be white.

However, since the Cr/Y and Cb/Y values employed in the above-described white detection method uniquely determine color information irrespective of the luminance of the object, this method causes an error by determining a region other than a white region to be white if both of the white object and an object of a chromatic color close to the blackbody radiation characteristic are included in the captured image.

It is particularly a problem that a flesh-colored object or an outdoor brown object, which shows the same color components as an achromatic-colored object under a light source of a low color temperature, such as an incandescent light, is apt to cause an error.

SUMMARY OF THE INVENTION

It is a general object of the present invention to provide a white balance control apparatus and method in which the above-described disadvantage is eliminated, and an image pickup apparatus employing such a white balance control apparatus.

A more specific object of the present invention is to provide a white balance control apparatus and method that reduce the frequency of errors in white balance control when a captured image includes both a white object and an object of a chromatic color having proximity to the blackbody radiation characteristic curve, and an image pickup apparatus employing such a white balance control apparatus.

The above objects of the present invention are achieved by a white balance control apparatus including an evaluation value calculation circuit calculating and outputting evaluation values of color components of each of a plurality of regions of digital image data, a luminance conversion part converting the evaluation values of each of the regions into a luminance value, and a high-luminance weighting part converting the evaluation values of each of the regions into a base white balance control amount, calculating a non-weighted white balance control amount from the base white balance control amount and a weighted white balance control amount by performing weighting processing on the base white balance control amount by using the luminance value of each of the regions so that a region of higher luminance has a greater weight, and calculating a white balance control amount to be applied to the image data at a time of image recording by using the weighted and non-weighted white balance control amounts.

According to the above-described white control apparatus, the influence of an error caused by the color components of an object of low luminance, which color components show proximity to a white light source on a screen, can be reduced by dividing an image into a plurality of regions, calculating white balance control amounts for each region, and performing weighting processing so that the weight of the white balance control amounts of a region becomes greater as its luminance becomes higher.

The above objects of the present invention are also achieved by a white balance control method including the steps of (a) calculating and outputting evaluation values of color components of each of a plurality of regions of digital image data, (b) converting the evaluation values of each of the regions into a luminance value, (c) converting the evaluation values of each of the regions into a base white balance control amount, (d) calculating a non-weighted white balance control amount from the base white balance control amount and a weighted white balance control amount by performing weighting processing on the base white balance control amount by using the luminance value of each of the regions so that a region of higher luminance has a greater weight, and (e) calculating a white balance control amount to be applied to the image data at a time of image recording by using the weighted and non-weighted white balance control amounts.

According to the above-described method, the same effects as described above can be produced.

The above objects of the present invention are further achieved by an image pickup apparatus including a control part controlling an operation of the entire image pickup apparatus, an image pickup part picking up an image of an object and converting data on the image into digital image data, a data processing part that processes the digital image data, an evaluation value calculation circuit calculating and outputting evaluation values of color components of each of a plurality of regions of the digital image data, a luminance conversion part converting the evaluation values of each of the regions into a luminance value, and a high-luminance weighting part converting the evaluation values of each of the regions into a base white balance control amount, calculating a non-weighted white balance control amount from the base white balance control amount and a weighted white balance control amount by performing weighting processing on the base white balance control amount by using the luminance value of each of the regions so that a region of higher luminance has a greater weight, and calculating a white balance control amount to be applied to the image data at a time of image recording by using the weighted and non-weighted white balance control amounts.

The above-described white balance control apparatus is suitably realized in the above-described image pickup apparatus.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description will be given, with reference to the accompanying drawings, of the configuration and operation of a white balance control apparatus of the present invention.

Figure 1:
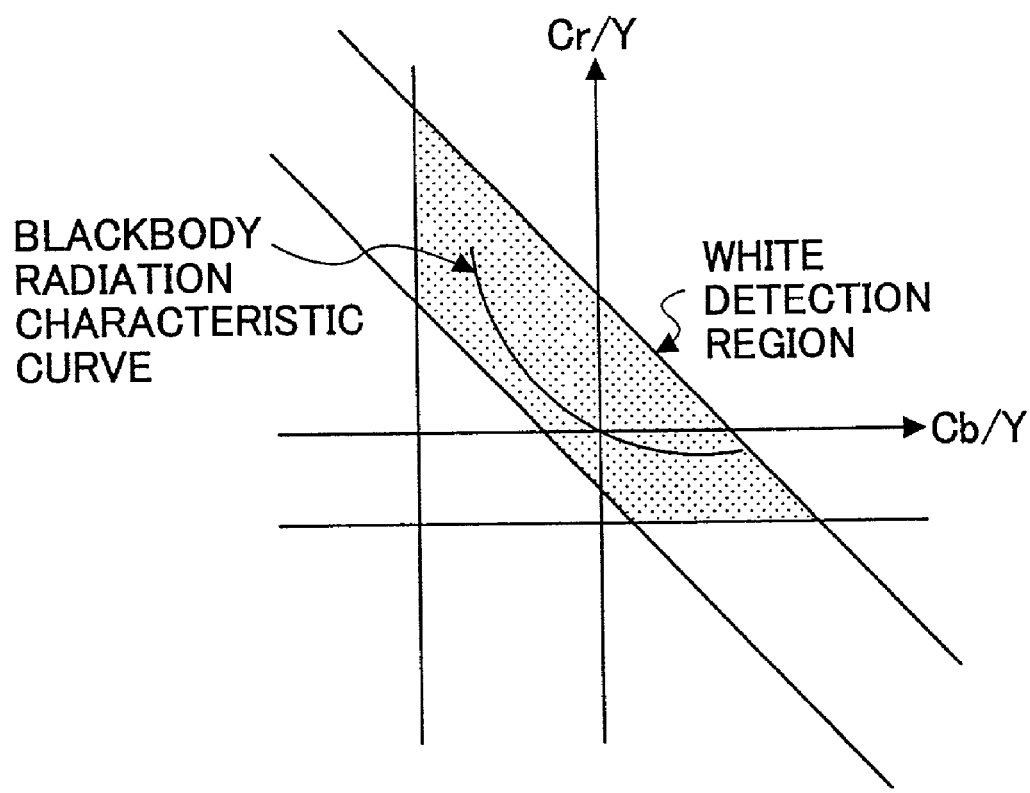
FIG. 1 is a diagram for illustrating a conventional white detection method.
Figure 2:
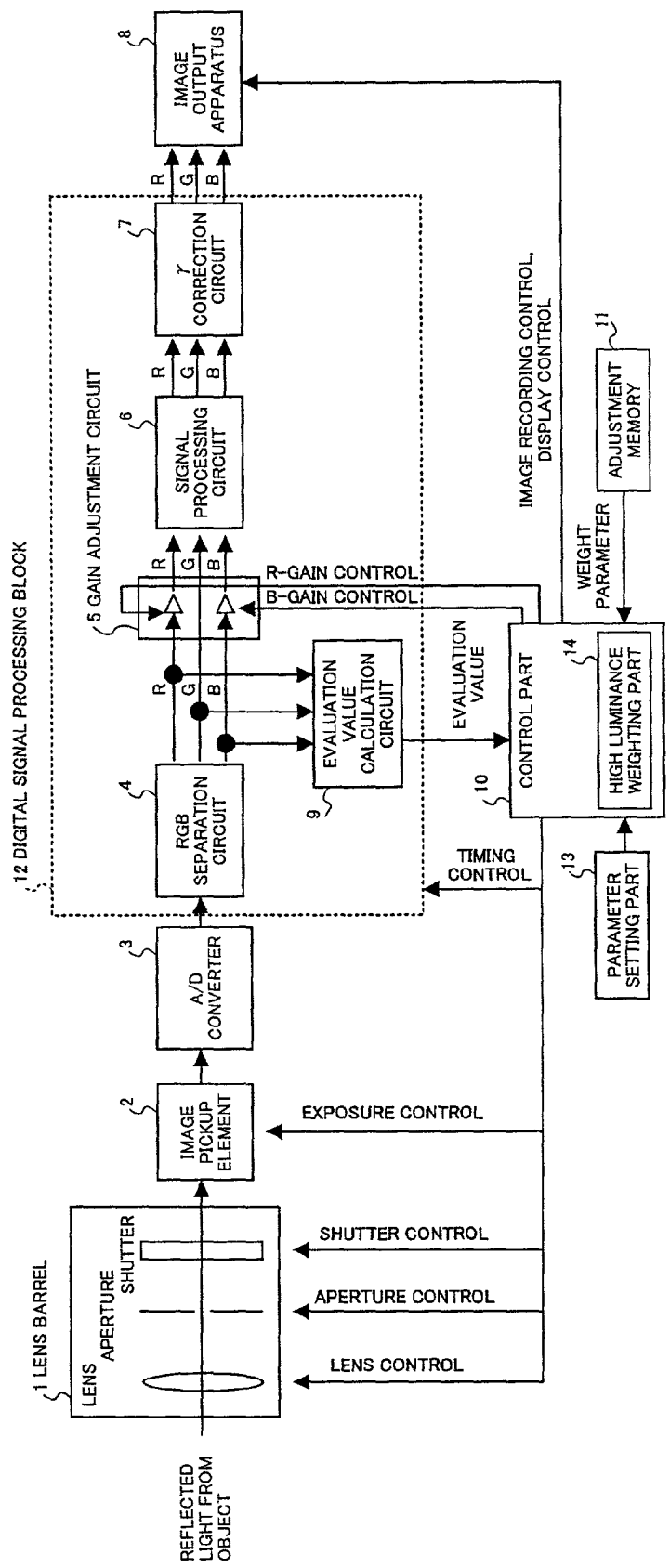
FIG. 2 is a block diagram showing a functional configuration of an embodiment of the present invention.

FIG. 2 is a block diagram showing a digital camera including an embodiment of the white balance control apparatus of the present invention.

The digital camera includes a lens barrel 1, an image pickup element 2, an analog-to-digital (A/D) converter 3, an RGB separation circuit 4, a gain adjustment circuit 5 for white balance, a signal processing circuit 6, a gamma (γ) correction circuit 7, and an image output apparatus 8.

The lens barrel 1 is composed of an optical lens, an aperture, and a mechanical shutter, which are driven in accordance with respective control signals supplied from outside so as to adjust the focal length and an amount of exposure.

The image pickup element 2, which is composed of a color CCD and a correlated double sampling circuit (CDS), receives light traveling through the lens barrel 1 and converts the received light into an electrical signal with reduced noise.

The A/D converter 3 converts the electrical signal supplied from the image pickup element 2 into a digital image signal.

The RGB separation circuit 4 separates the digital image signal by color component in accordance with an arrangement of the color filters of the CCD. In this embodiment, three color components of red (R), green (G), and blue (B) are used as the color filters of the CCD. That is, the RGB separation circuit 4 separates the digital image signal into the three color components of R, G, and B.

The gain adjustment circuit 5 adjusts white balance by increasing or decreasing the magnitude of the image signals of the R and B components by digital calculation in accordance with R-gain and B-gain control signals input from outside.

The signal processing circuit 6, if the CCD of the image pickup element 2 is of a single-plate type, performs color interpolation to supplement a lack of color information with the color signals of neighboring pixels and calculates full color data of a recorded image size, and further performs aperture correction to emphasize the outline of an image blurred by the interpolation.

The gamma correction circuit 7 performs γ correction of a gradation characteristic matching a display device.

The image output apparatus 8 is composed of an image display device or a memory recording image data. The light reflected from an object is subjected to the above-described operations and is finally output to the image output apparatus 8 as image data formatted to be viewed, for instance, as a photograph.

The digital camera further includes an evaluation value calculation circuit 9, a control part 10, an adjustment memory 11, a parameter setting part 13, and a high-luminance weighting part 14, which form the image pickup control system of the digital camera.

Figure 3:
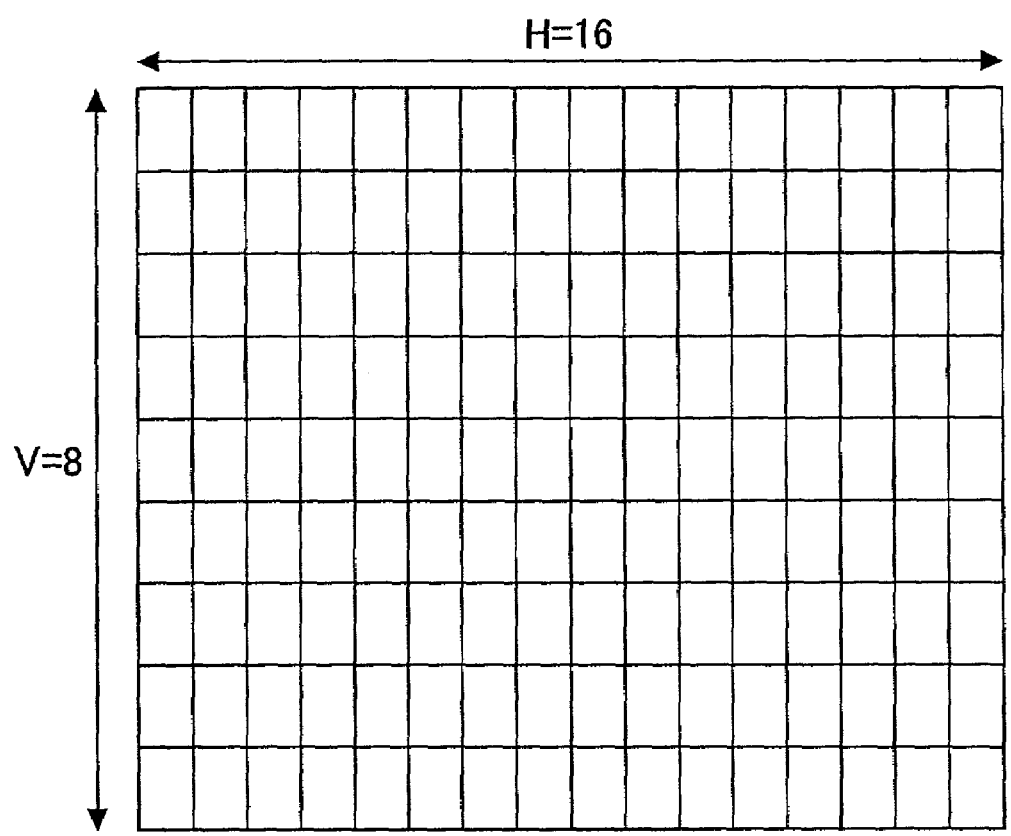
FIG. 3 is a diagram showing image data divided into a plurality of regions on a screen.

The evaluation value calculation-circuit 9 divides the image data separated in accordance with the R, G, and B filters in the RGB separation circuit 4 into a plurality of fine regions on a screen as shown in FIG. 3. Then, the evaluation value calculation-circuit 9 calculates the R, G, and B summation values of each region and outputs the summation values as evaluation values for white balance control. In FIG. 3, the screen is divided into 8×16 regions so that 128 (=8×16) summation values are output for each of R, G, and B, that is, 384 evaluation values are output in total.

The RGB separation circuit 4, the gain adjustment circuit 5, the signal processing circuit 6, the gamma correction circuit 7, and the evaluation value calculation circuit 9 form a digital signal processing block 12 indicated by a dotted-line rectangle in FIG. 2. The digital signal processing block 12, which is a part that performs repetitive high-speed digital calculations, preferably has its circuit formed of a special LSI of logic circuits.

Processing inside the digital signal processing block 12 is synchronized and controlled in accordance with a timing control signal input from outside.

The control part 10 controls the entire digital camera and calculates an amount of image pickup control of white balance. In capturing an image, the control part 10 outputs the drive control signals to the lens, the aperture, and the mechanical shutter in the lens barrel 1, the timing control signal for synchronizing image data transfer therewith to the digital signal processing block 12, and the R-gain and B-gain control signals as gain adjustment values of white balance to the gain adjustment circuit 5. Further, the control part 10 outputs an image display control signal or an image recording control signal to the image output apparatus 8.

The adjustment memory 11 retains a variety of adjustment data. The control part 10 refers to the data in the adjustment memory 11 and uses the data for processing such as white balance control.

The parameter setting part 13 is used by a digital camera operator to set a weight parameter of white balance to a desired value depending on the condition of an object. A simple potentiometer or a changeover switch can be employed as the parameter setting part 13. The control part 10 reads out from the adjustment memory 11 a parameter for calculation corresponding to the value of the weight parameter set by the parameter setting part 13, and performs white balance weighting as described later.

The high-luminance weighting part 14, based on an instruction from the control part 10, temporarily converts the evaluation values of the color components of each region of the divided screen, which evaluation values have been output from the evaluation value calculation circuit 9, into base amounts of white balance control (base white balance control amounts). Further, based on values (luminance values) obtained by also converting the evaluation values of given regions into luminance, the high-luminance weighting part 14 performs (high-luminance) weighting or weighting processing so that a region is assigned a greater weight as its luminance becomes higher, and as a result of weighting, the region obtains weighted (weighting-processed) white balance control amounts. Then, the high-luminance weighting part 14 calculates white balance control amounts applied to image data at the time of image recording from both weighted white balance control amounts and non-weighted white balance control amounts, which are obtained by averaging each of the white balance control amounts. Here, the luminance value of each region may be calculated in the evaluation value calculation circuit 9.

A description will be given, with reference to the flowchart of FIG. 4, of a white balance adjustment operation in the digital camera of FIG. 2.

First, in step S1, preliminary exposure control is performed to generate evaluation values for white balance calculation.

In step S2, the evaluation values of image data obtained as a result of the exposure are calculated by the evaluation value calculation circuit 9 and are read.

In step S3, an r-gain and a b-gain, which are white balance control amounts, are calculated for each region of the image data based on the read evaluation values thereof. Processing in a case where an R or B summation value is zero is performed in this step.

Next, in step S4, the evaluation values of each region calculated in the evaluation value calculation circuit 9 are converted into a luminance value Y in accordance with the following equation:

$$Y = 0.3 * R \text{ summation value} + 0.6 * G \text{ summation value} + 0.1 * B \text{ summation value}$$

That is, 8×16=128 luminance values Y are obtained in total from as many regions.

In step S5, white detection is performed on all the regions of the image data by determining whether the calculated r-gains and b-gains are included in a color region along the blackbody radiation characteristic curve.

The white detection of white balance is performed in the following manner, for instance. First, only regions along the blackbody radiation characteristic curve with color temperatures that appear white to human eyes are selected based on the color information of the screen output from the evaluation value calculation circuit 9. Then, an amount of color shift in the present condition of white balance control is calculated from the evaluation values of colors of each selected region.

The output of the evaluation value calculation circuit 9 is the R, G, and B summation values. Unless the R or B summation value is zero, these summation values of the 128 (=8×16) regions are converted into as many r-gain and b-gain values in accordance with the following equations:

$$r\text{-gain} = G \text{ summation value} / R \text{ summation value}$$

$$b\text{-gain} = G \text{ summation value} / B \text{ summation value}$$

Figure 5:
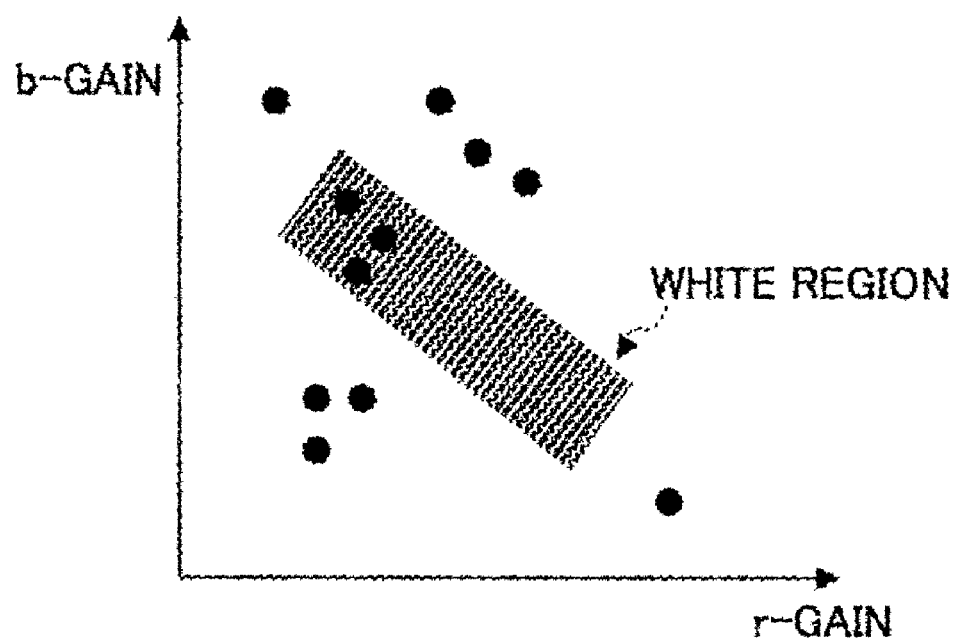
FIG. 5 is a diagram for illustrating a white detection method according to the present invention.

The obtained r-gain and b-gain values are placed in corresponding positions on an r-gain-b-gain coordinate plane as shown in FIG. 5. If at least one of the R and B summation values of a region is zero, obviously, it is inappropriate to use data on the region for white balance control. Therefore, the data on the region is excluded from the calculation and the region is treated as nonexistent.

On the other hand, a hatched region in FIG. 5 shows the region of the color temperatures that appear white to human eyes along the blackbody radiation characteristic curve on the r-gain-b-gain coordinate plane. Determination as to whether a region of the image data is white is accomplished by determining whether a position determined by the r-gain and b-gain of the region is included in the hatched region on the r-gain-b-gain coordinate plane. That is, in FIG. 5, a region corresponding to a coordinate position (indicated by a black circle) included in the hatched region is determined to be white.

For instance, if a region has an R summation value of 5, a G summation value of 10, and a B summation value of 20, the r-gain and b-gain of the region are given as follows:

$r$-gain=10/5=2.0

$b$-gain=10/20=0.5

When R and B input signals (the R and B summation values) are multiplied by these calculation results as white balance gain coefficients, an output R summation value R_out and an output B summation value B_out on the output side are given as follows:

$R\_out = R$ summation value $\times r$-gain$=5\times2.0=10.0$ $B\_out = B$ summation value $\times b$-gain$=20\times0.5=10.0$ Thus, the region is corrected to an achromatic color of R summation value=G summation value=B summation value=10, that is, R:G:B=1:1:1.

In step S6, the sums of the r-gains and the b-gains of regions determined to be white in step S5 (white regions) are calculated.

In step S7, the sum of the luminance values Y of the white regions is calculated.

In step S8, the sum of values obtained by multiplying the r-gain values of the white regions by the corresponding luminance values Y (or the sum of (r-gain*Y)s) and the sum of values obtained by multiplying the b-gain values of the white regions by the corresponding luminance values Y (or the sum of (b-gain*Y)s) are calculated by using the r-gain and b-gain values of each region calculated in step S3 and the luminance value of each region calculated in step S4.

In step S9, an R-gain_Auto and a B-gain_Auto, which are average values of the r-gains and the b-gains of the white regions without high-luminance weighting processing, are calculated from the sums of the r-gains and b-gains of the white regions obtained in step S6 and the number of the white regions determined in step S5.

In step S10, an R-gain_hi and a B-gain_hi, which are weighted amounts of white balance control by high-luminance weighting processing, are calculated by using the sums of the (r-gain*Y) values and the (b-gain*Y) values of the white regions calculated in step S8, and the sum of the luminance values Y of the white regions calculated in step S7.

An example calculation of the R-gain_Auto, the B-gain_Auto, the R-gain_hi, and the B-gain_hi is given below.

Suppose that the white regions are a region x and a region y, and that the region x has an R summation value R_x of 10, a G summation value G_x of 20, and a B summation value B_x of 40 and the region y has an R summation value R_y of 10, a G summation value G_y of 40, and a B summation value B_y of 50, the r-gain and the b-gain of each of the regions x and y are given as follows:

Region x:

$r$-gain$\_x=G\_x/R\_x=20/10=2.0$ $b$-gain$\_x=G\_x/B\_x=20/40=0.5$

Region y:

$r$-gain$\_y=G\_y/R\_y=40/10=4.0$ $b$-gain$\_y=G\_y/B\_y=40/50=0.8$

Since the R-gain_Auto and the B-gain_Auto, which are white balance control amounts without high-luminance weighting, or non-weighted white balance control amounts, are the average values of the r-gain values and the b-gain values of the regions x and y, the R-gain_Auto and the B-gain_Auto are given as follows:

$R$-gain$\_$Auto$=(r$-gain$\_x+r$-gain$\_y)$/number of white regions$=(2.0+4.0)/2=3.0$ $B$-gain$\_$Auto$=(b$-gain$\_x+b$-gain$\_y)$/number of white regions$=(0.5+0.8)/2=0.65$ The luminance value Y of each of the regions x and y is given as follows:

Region x:

$Y\_x=0.3*R\_x+0.6*G\_x+0.1*B\_x=0.3*10+0.6*20+0.1*40=19$

Region y:

$Y\_y=0.3*R\_y+0.6*G\_y+0.1*B\_y=0.3*10+0.6*40+0.1*50=32$

Next, the R-gain_hi and the B-gain_hi, which are values obtained by dividing the sums of the (r-gain*Y)s and the (b-gain*Y)s of the regions x and y by the sum of the luminance values Y of the regions x and y, are given as follows:

$R$-gain$\_hi=(r$-gain$\_x*Y\_x+r$-gain$\_y*Y\_y)/(Y\_x+Y\_y)=(2.0*19+4.0*32)/(19+32)=3.25$ $B$-gain$\_hi=(b$-gain$\_x*Y\_x+b$-gain$\_y*Y\_y)/(Y\_x+Y\_y)=(0.5*19+0.8*32)/(19+32)=0.69$ Next, in step S11, a weight parameter for calculation corresponding to a parameter set to a desired value in the parameter setting part 13 is read out from the adjustment memory 11.

In step S12, an R-gain and a B-gain, which are white balance control amounts used finally at the time of image recording, are obtained by calculating, using the weight parameter read in step S11, the weighted average of the R-gain_Auto calculated in step S9 and the R-gain_hi calculated in step S10 and the weighted average of the B-gain_Auto calculated in step S9 and the B-gain_hi calculated in step S10.

In this weighted average obtaining processing, letting the weight parameter read out from the adjustment memory 11 be any value k between one and ten, the R-gain and B-gain for recording are calculated by the following equations:

$R$-gain$=(R$-gain$\_$Auto$*k+R$-gain$\_hi*(10-k))/10$ $B$-gain$=(B$-gain$\_{Auto}*k+B$-gain$\_hi*(10-k))/10$ Here, if the value k of the weight parameter is 5, that is, if the ratio of the weight of the high-luminance weighting result (the R-gain_hi and B-gain_hi) to the weight of the result without high-luminance weighting (the R-gain_Auto and B-gain_Auto) is 5:5=1:1, the R-gain and the B-gain are given as follows:

$R$-gain$=(R$-gain$\_$Auto$*k+R$-gain$\_hi*(10-k))/10=(3.0*5+3.25*(10-5))/10=3.125$ $B$-gain$=(B$-gain$\_$Auto$*k+B$-gain$\_hi*(10-k))/10=(0.65*5+0.69*(10-5))/10=0.67$ In step S13, white balance control is performed by using the R-gain and the B-gain obtained as a result of the above-described calculation as the final amounts of white balance control for image recording.

In step S14, an image subjected to this white balance control is output.

As a variation of the above-described embodiment, the white balance control apparatus of the present invention may be configured so that white balance control is performed by simply performing high-luminance weighting processing on each region.

Figure 4:
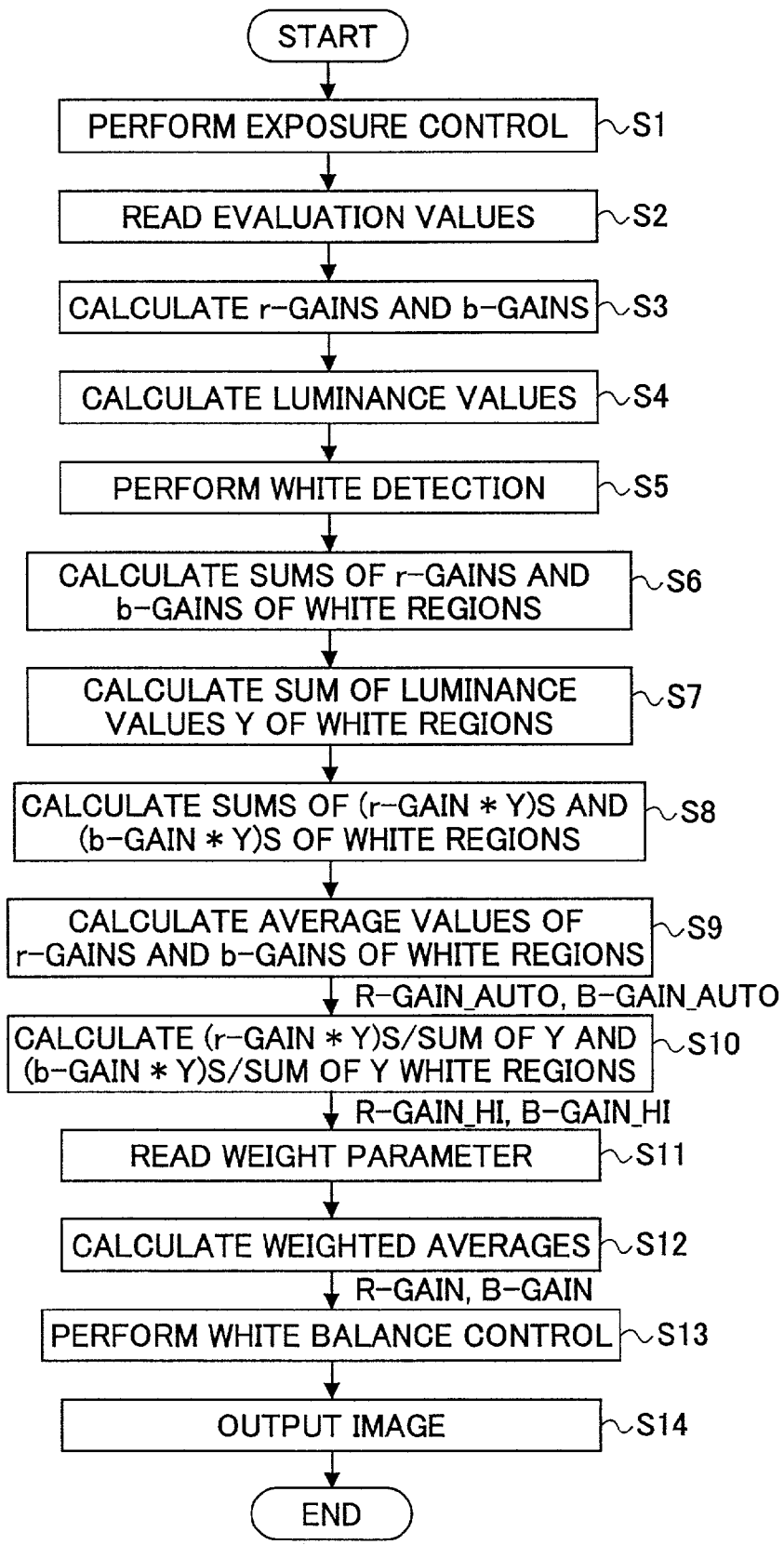
FIG. 4 is a flowchart of an operation of the embodiment of the present invention.

In this case, the white determination processing of step S5 of FIG. 4 is unnecessary, and the following steps to be performed on the white regions are performed on all the regions. This case is equal in the other points to the above-described case of the embodiment, and accordingly, a description thereof will be omitted.

The following effects may be produced by the above-described configuration of the present invention.

Influence of an error caused by the color components of an object of low luminance, which color components show proximity to a white light source on a screen, can be reduced by (a) dividing an image into a plurality of regions, (b) calculating white balance control amounts for each region, and (c) performing weighting processing so that the weight of the white balance control amounts of a region becomes greater as its luminance becomes higher.

With respect to each high-luminance region, both of the weighted and non-weighted amounts of white balance control can be used, and the ratio of the former to the latter can be adjusted by a parameter that can be set to any value. Therefore, in the case of capturing an image of a special object whose high-luminance regions on the screen are not white, high-luminance weighting processing can be performed to have its effects properly adjusted in magnitude.

White balance control with reduced errors can be realized by not only depending on the fact that a high-luminance region has a higher probability of being white but also regarding a region close to the characteristic of blackbody radiation as a white region.

As described above, according to the present invention, errors caused when a screen simultaneously includes a white or an achromatic-colored object and an object of chromatic color having color components along the blackbody radiation characteristic curve, such as a flesh color, can be reduced by taking advantage of the fact that a region of higher luminance on a screen statistically has a higher probability of being included in a white or achromatic-colored object.

The present invention is not limited to the specifically disclosed embodiment, but variations and modifications may be made without departing from the scope of the present invention.

The present application is based on Japanese priority application No. 2001-024636 filed on Jan. 31, 2001, the entire contents of which are hereby incorporated by reference.

What is claimed is:

1. A white balance control apparatus comprising:
   an evaluation value calculation circuit calculating and outputting evaluation values of color components of each of a plurality of regions of digital image data;
   a luminance conversion part converting the evaluation values of each of the regions into a luminance value; and
   a high-luminance weighting part converting the evaluation values of each of the regions into a base white balance control amount, calculating a non-weighted white balance control amount from the base white balance control amount and a weighted white balance control amount by performing weighting processing on the base white balance control amount by using the luminance value of each of the regions so that a region of higher luminance has a greater weight, and calculating a white balance control amount to be applied to the image data at a time of image recording by using the weighted and non-weighted white balance control amounts.

2. The white balance control apparatus as claimed in claim 1, wherein said high-luminance weighting part obtains the weighted white balance control amount by dividing, by a sum of the luminance values of the regions, a sum of values obtained by multiplying the base white balance control amounts of the regions by the corresponding luminance values.

3. The white balance control apparatus as claimed in claim 1, wherein said high-luminance weighting part calculates the non-weighted white balance control amount by averaging the base white control amounts of the regions.

4. The white balance control apparatus as claimed in claim 1, wherein said evaluation value calculation circuit calculates the evaluation value of each of the color components of each of the regions by summing values of each of the color components of each of the regions.

5. The white balance control apparatus as claimed in claim 1, wherein said evaluation value calculation circuit comprises said luminance conversion part.

6. The white balance control apparatus as claimed in claim 1, wherein said high-luminance weighting part comprises said luminance conversion part.

7. The white balance control apparatus as claimed in claim 1, further comprising a control part controlling an operation of the entire apparatus,
   wherein said control part comprises said high-luminance weighting part.

8. The white balance control apparatus as claimed in claim 1, further comprising a white determination part determining whether a region is white based on the base white balance control amount of the region,
   wherein said high-luminance weighting part calculates the weighted and non-weighted white balance control amounts based on the base white control amount and the luminance value only of regions determined to be white by said white determination part.

9. The white balance control apparatus as claimed in claim 1, wherein said high-luminance weighting part employs a weighted average of the weighted and non-weighted white balance control amounts as the white balance control amount to be applied to the image data, the weighted average being obtained by using a parameter set to a desired value.

10. The white balance control apparatus as claimed in claim 8, wherein said high-luminance weighting part comprises said white determination part.

11. A white balance control method comprising the steps of:
   (a) calculating and outputting evaluation values of color components of each of a plurality of regions of digital image data;
   (b) converting the evaluation values of each of the regions into a luminance value;
   (c) converting the evaluation values of each of the regions into a base white balance control amount;
   (d) calculating a non-weighted white balance control amount from the base white balance control amount and a weighted white balance control amount by performing weighting processing on the base white balance control amount by using the luminance value of each of the regions so that a region of higher luminance has a greater weight; and (e) calculating a white balance control amount to be applied to the image data at a time of image recording by using the weighted and non-weighted white balance control amounts.

12. The white balance control method as claimed in claim 11, wherein said step (d) obtains the weighted white balance control amount by dividing, by a sum of the luminance values of the regions, a sum of values obtained by multiplying the base white balance control amounts of the regions by the corresponding luminance values.

13. The white balance control method as claimed in claim 11, wherein said step (d) calculates the non-weighted white balance control amount by averaging the base white control amounts of the regions.

14. The white balance control method as claimed in claim 11, wherein said step (a) calculates the evaluation value of each of the color components of each of the regions by summing values of each of the color components of each of the regions.

15. The white balance control method as claimed in claim 11, further comprising the step of (f) determining whether a region is white based on the base white balance control amount of the region,
wherein said step (d) calculates the weighted and non-weighted white balance control amounts based on the base white control amount and the luminance value only of regions determined to be white by said step (f).

16. The white balance control method as claimed in claim 11, wherein said step (e) employs a weighted average of the weighted and non-weighted white balance control amounts as the white balance control amount to be applied to the image data, the weighted average being obtained by using a parameter set to a desired value.

17. An image pickup apparatus comprising:
a control part controlling an operation of the entire image pickup apparatus;
an image pickup part picking up an image of an object and converting data on the image into digital image data;
a data processing part that processes the digital image data;
an evaluation value calculation circuit calculating and outputting evaluation values of color components of each of a plurality of regions of the digital image data;
a luminance conversion part converting the evaluation values of each of the regions into a luminance value; and
a high-luminance weighting part converting the evaluation values of each of the regions into a base white balance control amount, calculating a non-weighted white balance control amount from the base white balance control amount and a weighted white balance control amount by performing weighting processing on the base white balance control amount by using the luminance value of each of the regions so that a region of higher luminance has a greater weight, and calculating a white balance control amount to be applied to the image data at a time of image recording by using the weighted and non-weighted white balance control amounts.

18. The image pickup apparatus as claimed in claim 17, wherein said high-luminance weighting part obtains the weighted white balance control amount by dividing, by a sum of the luminance values of the regions, a sum of values obtained by multiplying the base white balance control amounts of the regions by the corresponding luminance values.

19. The image pickup apparatus as claimed in claim 17, wherein said high-luminance weighting part calculates the non-weighted white balance control amount by averaging the base white control amounts of the regions.

20. The image pickup apparatus as claimed in claim 17, wherein said evaluation value calculation circuit calculates the evaluation value of each of the color components of each of the regions by summing values of each of the color components of each of the regions.

21. The image pickup apparatus as claimed in claim 17, wherein said evaluation value calculation circuit comprises said luminance conversion part.

22. The image pickup apparatus as claimed in claim 17, wherein said high-luminance weighting part comprises said luminance conversion part.

23. The image pickup apparatus as claimed in claim 17, wherein said control part comprises said high-luminance weighting part.

24. The image pickup apparatus as claimed in claim 17, wherein said high-luminance weighting part employs a weighted average of the weighted and non-weighted white balance control amounts as the white balance control amount to be applied to the image data, the weighted average being obtained by using a parameter set to a desired value.

25. The image pickup apparatus as claimed in claim 17, further comprising an image output part outputting the image of the object.

26. The image pickup apparatus as claimed in claim 17, further comprising a white determination part determining whether a region is white based on the base white balance control amount of the region,
wherein said high-luminance weighting part calculates the weighted and non-weighted white balance control amounts based on the base white control amount and the luminance value only of regions determined to be white by said white determination part.

27. The image pickup apparatus as claimed in claim 26, wherein said high-luminance weighting part comprises said white determination part.

* * * * *